UNITED STATES PATENT OFFICE.

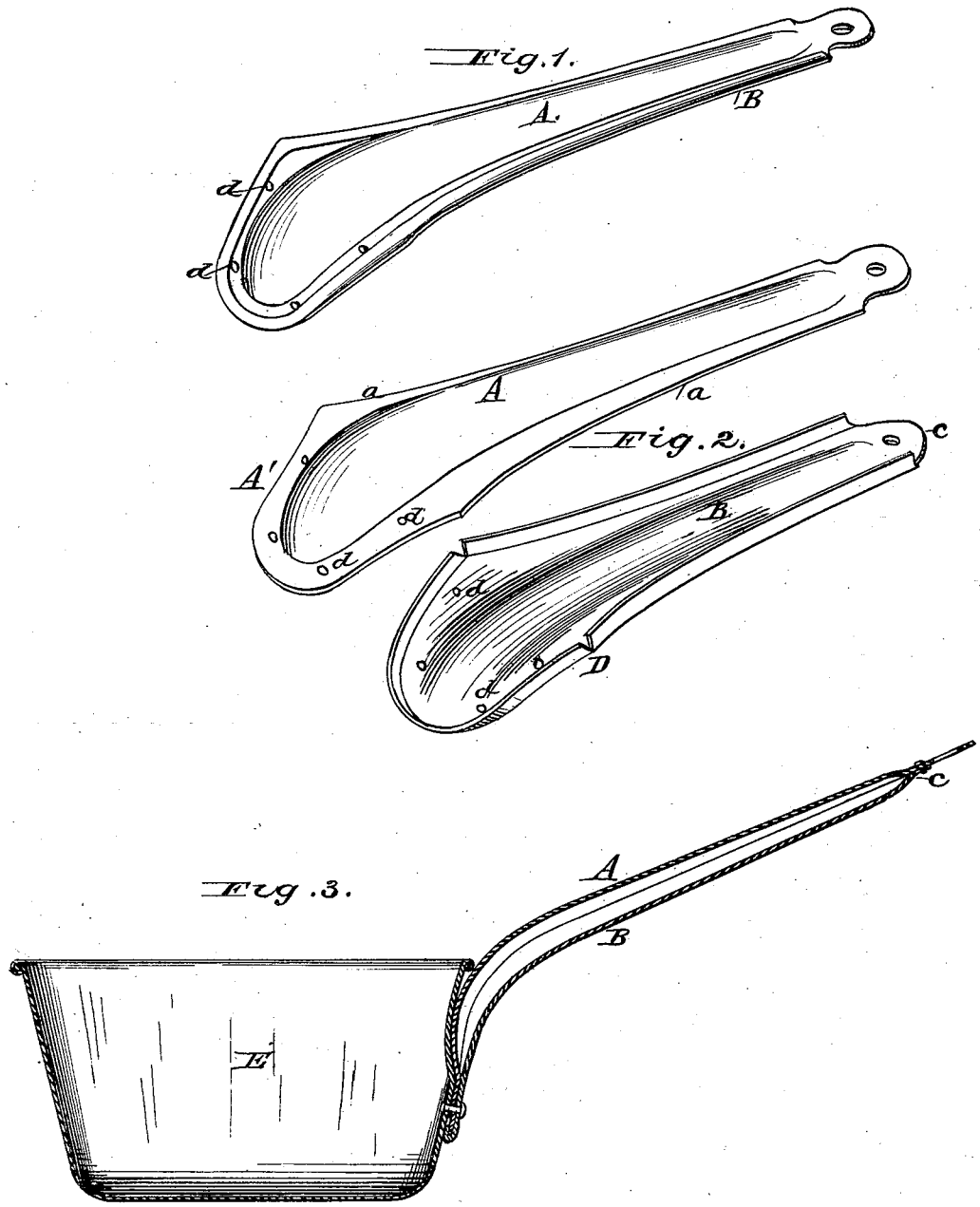

FLORIAN GROSJEAN, OF NEW YORK, N. Y., ASSIGNOR TO LALANCE & GROSJEAN MANUFACTURING COMPANY, OF SAME PLACE.

IMPROVEMENT IN HANDLES FOR SHEET-METAL VESSELS OR UTENSILS.

Specification forming part of Letters Patent No. 202,541, dated April 16, 1878; application filed March 16, 1878.

*To all whom it may concern:*

Be it known that I, FLORIAN GROSJEAN, of New York, in the county of New York and State of New York, have invented certain new and useful Improvements in Handles for Sheet-Metal Vessels or Utensils, of which the following is a specification:

This invention relates to hollow inclosed sheet-metal handles for cooking utensils, fire-shovels, and similar articles; and consists in forming the inclosed hollow handle of such an article of two approximately semi-cylindrical shells with facing concave surfaces, one of which shells has lips or flanges bent over from its opposite longitudinal edges and end edge, and embracing the edges of the other, both of said shells flaring and bent to form an elbow at the wider portion of the handle, which is adapted for attachment to a wall of sheet-metal vessel by riveting.

In the accompanying drawing, Figure 1 represents a perspective view of a handle constructed according to my invention. Fig. 2 is a perspective view of the two shells separated. Fig. 3 is a diametric section of a sauce-pan and longitudinal central section of its handle.

The letter A indicates the upper shell, which increases in width toward the end by which it is to be attached, and is bent in an obtuse angle, as shown at A', the struck-up concave portion flaring as the width of the shell is increased. The end of the elbow portion is rounded, and a continuous flat edge, *a*, surrounds the entire shell. B designates the lower shell, having its concavity opposite to that of the upper shell, and bent to form an elbow at D. The edges of this lower shell are bent over to embrace the opposite longitudinal edges and curved end edge of the upper shell, and its outer or smaller end is pointed and flattened to lie close against the lower surface of said upper shell, and is riveted thereto, as shown at *c*. Near the curved edge of the wider end of the inclosed handle formed by the two parts mentioned are rivet-holes *d*, by means of which said handle may be attached to the vessel or utensil, as shown in Fig. 3, in which the vessel E is shown as having an indentation corresponding to the form of the convex surface of the elbow of the handle.

It is obvious that the elbow of the handle may be formed to fit upon the continuously-curved wall of a vessel having neither an inward indentation nor outwardly-projecting lip; but these are preferable, in order to afford a firmly-braced junction between the body and the handle of the vessel.

By the construction of handle hereinbefore described is secured all the strength of a solid handle of the same size without its very objectionable weight. My improved handle is also of convenient form to be grasped by the hand, and its hollow construction prevents it retaining heat.

Having now described my invention, I claim—

An inclosed hollow handle consisting of two approximately semi-cylindrical shells with facing concave surfaces, one of which shells has lips or flanges bent over from its opposite longitudinal edges and end edge, and embracing the edges of the other, both of said edges flaring and bent to form an elbow at the wider portion of the handle, which is adapted for attachment to the wall of a sheet-metal vessel or utensil by riveting, substantially as described.

In testimony that I claim the foregoing I have hereunto set my hand in the presence of the subscribing witnesses.

F. GROSJEAN.

Witnesses:
THOMAS COCHRAN,
JAMES COCHRAN.